Patented Nov. 8, 1932

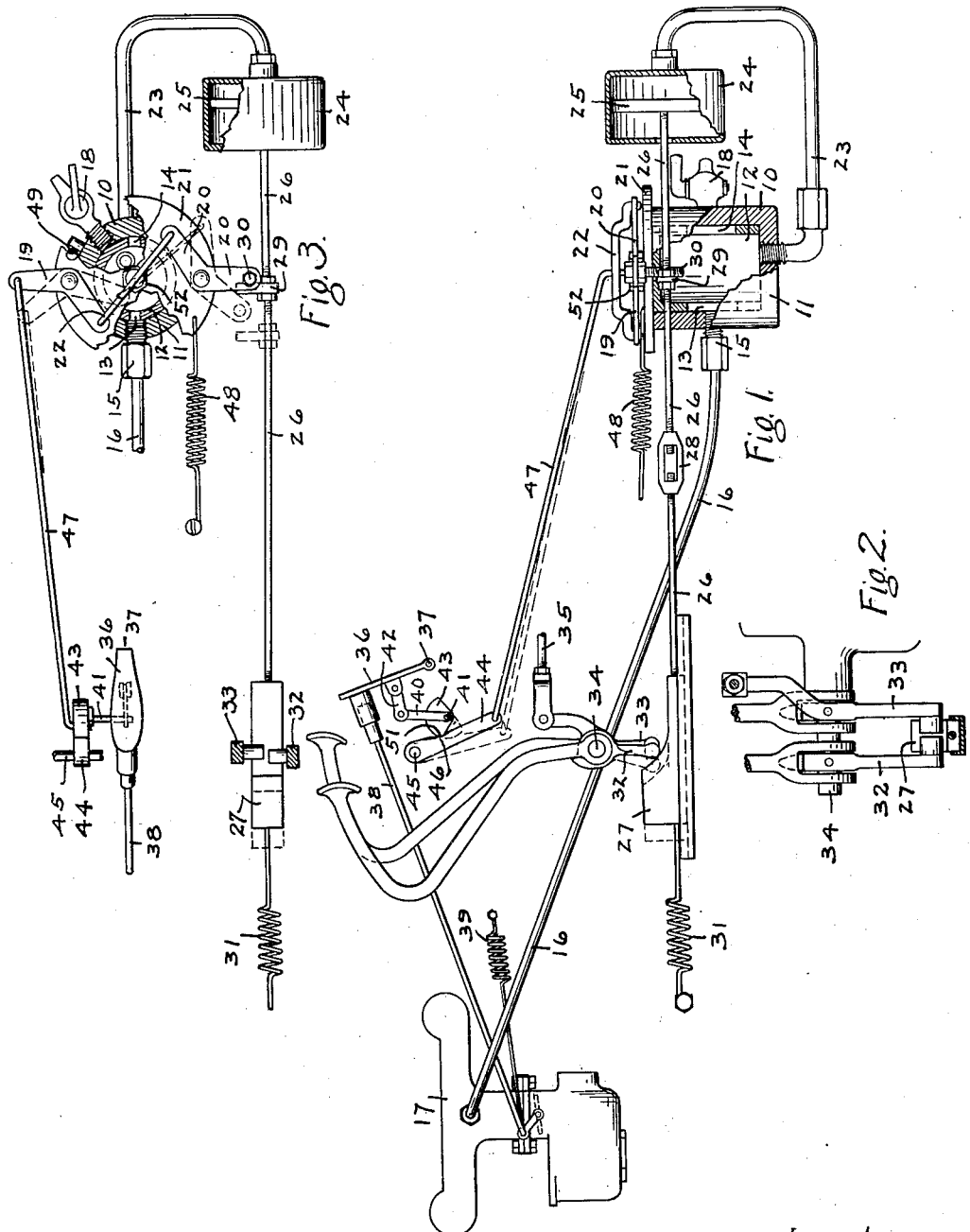

1,886,569

UNITED STATES PATENT OFFICE

VIRGIL H. MEDLOCK, OF NEAR BLOOMINGTON, INDIANA

AUTOMATIC CLUTCH AND BRAKE CONTROL

Application filed March 31, 1932. Serial No. 602,138.

This invention relates to the art of automobile clutch and brake controls and particularly to means vacuum operated in conjunction with a throttle control.

My invention is adapted to be applied to an automobile of the common construction having a clutch for disengaging the engine from the drive to the wheels and having a brake operating lever. A primary object of my invention is to provide a control mechanism automatically operable upon movement of a throttle control and in synchronism with that movement whereby the clutch and brake action may be controlled entirely, if desired, by movement of the throttle control.

A further primary object of my invention is to provide a common means for actuating a clutch throw-out mechanism and for actuating the brakes and so construct said means that the clutch and brakes may be simultaneously or the clutch alone operated.

A further object of my invention is to provide a clutch and brake control valve to be initially operable by movement of the throttle control and to have its operation modified upon movement of clutch or brake actuating members to the end that a smooth control action may be had.

A further advantage of my invention resides in the forming of a control valve and hookup between the throttle control and clutch and brake control to have the valve floating between those controls, in that movements of both controls affect the action of the valve in a compensating manner so that the engine speed may be varied and the clutch and brakes controlled all as desired without racing the engine or without harsh action of the clutch or brakes simply by varying the engine throttle control to meet the occasion.

Other objects and advantages of the invention are that a "free wheeling" or coasting effect is obtained without having to employ additional clutches, and that the clutch is always automatically disengaged before the brakes are applied, which fact alone prevents stalling of the engine upon making a sudden stop. The invention provides for a very simple, inexpensive structure, easily applied to an automobile and having but few parts.

These and other objects and advantages will become apparent in the following description of the invention as more or less diagrammatically illustrated by the accompanying drawing, in which Fig. 1 is a diagrammatic side elevation of an assembly embodying my invention;

Fig. 2, a detail in front elevation of the clutch lever, brake lever and operating cam block; and Fig. 3, a diagrammatic top plan view of the assembly.

Like characters of reference indicate like parts in the several views.

I form a control valve generally designated by the numeral 10 to have a body 11 bored to receive from the top side an inverted cup shaped, hollow plug 12. This plug 12 is provided with diametrically opposed ports 13 and 14 whereas the body is provided with two non-diametrically disposed ports, with which the plug ports may selectively register upon rotation of the plug. One of the body ports is provided with a fitting 15 from which a vacuum line 16 runs to the intake manifold 17 of the engine (not shown). A valve 18 is fitted into the other body port simply as a means for varying the effective area of that port. On the top, outer end of the plug 12, are rockably mounted two bell crank levers 19 and 20 on diametrically located pivot points equally spaced outwardly from the center of rotation of the plug 12. A plate 21 is here shown as being fixed on the plug end as a convenient member on which the levers may be mounted.

The inner ends of these levers 19 and 20 are interconnected by a link 22 so that as the outer end of one lever may be moved in one direction, the outer end of the other lever will move in the opposite direction, or as the outer end of one lever may be held and the outer end of the other lever moved, the plug 12 will be rotated in the direction of the moving of the second outer end.

From the under side of the body 11 leads a pipe line 23 to the back end of a cylinder 24, within which is a piston 25 having a rod 26 fixed thereto and extending forwardly from the cylinder to engage with a cam block 27. Preferably a turnbuckle 28 is interposed in this rod 26 as a means of adjustably spacing the block 27 in reference to the piston 25 by changing the length of the rod. The valve 10 is located adjacent to this rod 26 and an arm 29 is fixed to the rod. A pin 30 is fixed to the outer arm of the lever 20 to extend downwardly into the path and to the rear of the arm 29.

A spring 31 normally pulls the cam block 27 and the connected rod 26 and piston 25 to forward positions. The block 27 is provided with a top face sloping downwardly and rearwardly from a forward horizontal face to a rear, lower horizontal face, and this sloping face is in the path of the lower ends of clutch and brake operating levers 32, 33 respectively. The clutch lever 32 is fixed to the clutch throwout shaft 34, whereas the brake lever 33 is rockably mounted on the shaft 34 and has a brake connecting rod 35 fixed to its upper end beyond its fulcrum on the shaft. A foot throttle pedal 36 of the usual type is pivoted at its lower end at the point 37 and rocks against the throttle rod 38, the pedal 36 being normally retained in an upper position with closed throttle by the spring 39. A lever 40 is mounted on a shaft 41 and a link 42 interconnects the pedal 36 and the lever 40 whereby the shaft 41 may be rocked upon movement of the pedal 36. The lower end of the lever 32 normally stands ahead of the lower end of the lever 33. A cam 43 is fixed on the shaft 41, and a downturned lever 44, pivoted at its upper end at 45 is provided to be in the path of this cam 43 as the cam may be rocked. This lever 44 has a notch 46 in its rear edge over which the cam 43 may pass. A rod 47 interconnects the lower end of the lever 44 and the outer arm of the bell crank lever 19. A spring 48 normally pulls the plug 12 around to an open position with the vacuum line 16. A stop pin 49 limits further travel of the plug after reaching that open position.

Assuming that the automobile is stationary with the engine thereof not running and it is desired to get the automobile under way, the engine is started in the usual manner and thereby a partial vacuum is created in the manifold 17 and the line 16. The normal position of the valve plug 12 when the engine stops is that with the port 13 in registry with the body port leading to the line 16 by reason of the spring 48 pulling the plug around to have the stop 49 limit the rotation thereof to that position. Also, the normal position of the block 27 is at its extreme forward limit of travel out of engagement with both the clutch and brake levers 32 and 33, thus allowing the clutch to be engaged and the brakes unapplied. The arm 29 is then at some distance ahead of and spaced from the pin 30 of the lever 20. Now as soon as there is a reduction in pressure in the line 16, air is drawn from behind the piston 25 through the line 23 and plug 12 which permits atmospheric pressure to push the piston 25 backward and thus pull back the block 27 to first strike against the clutch lever 32 and rock it back to disengage the clutch and then strike the brake lever 33 and rock it back to apply the brakes. By the time the lever 33 is rocked back, the arm 29 then has travelled back to be immediately in front of the pin 30 of the lever 20.

With the engine running, the clutch disengaged and the brakes applied, the transmission gears may be suitably shifted in the usual manner, following which the foot throttle pedal 36 is then pressed forwardly to accelerate the engine speed. Forward travel of the pedal 36 rocks the cam 43 against the lever 44 to rock it to cause the rod 47 to pull forwardly on the lever 19. Since the pin 30 then is against the arm 29, unrestrained rocking of the lever 19 on the plate 21 is not permitted by reason of the link 22 connecting the inner arms of the two levers 19 and 20. Therefore, since pin 30 is held by the arm 29 to prevent forward travel, the pull on the lever 19 will rotate the plug 12 around against the pull of the spring 48 to carry the port 13 out of registry with the vacuum line port and bring the port 14 around to registry with the intake port in which the regulating valve 18 is located. By reason of the leverage system here shown, there will be a slight rotary motion of both levers 19 and 20 in relation to the plate 21 with the result that as the plug 12 is rotated as indicated, the outer end of the lever 19 is brought around somewhat closer to the outer end of the lever 20 on the forward side of the plate.

As soon as the plug 12 is thus rotated, air passes in through the valve 18 at a rate determined by the setting of that valve, and fills in behind the piston 25 to allow the spring 31 to pull the block 27 forwardly to first release the brake lever 33 to release the brakes. By the time the block has travelled that distance, the arm 29 has likewise moved ahead, and the spring 48 has revolved the plate 21 to pull the lever 20 around thereafter and consequently has rotated the plug 12 clockwise to shift the port 14 partly if not entirely out of registry with the intake port so that the block 27 then comes to a stop since the air inflow is reduced or cut-off and the spring 31 can not pull the piston 25 forwardly. In this position the port 13 has not come back into registry with the vacuum line port. Before the block 27 may travel on ahead to release the lever 32, the foot throttle pedal 36 must be pushed ahead slightly to again pull ahead on the lever 19 to cause the pin 30 to strike the arm 29 and then allow continued pull on the lever 19 to shift the plate 21 anti-clockwise to bring the port 14 back into registry with the intake port for further admission of air. As the arm 29 again moves ahead, the plate 21 will revolve back clockwise under the pull of the spring 48, and as the arm 29 moves ahead away from the pin 30, the lever 19 being then held by its outer end will rotate relative to the moving plate to have its inner end strike the center stop 52 and be held against further clockwise movement and by further pressing forward on the pedal 36, the lever 19 then bearing against the stop 52 and the lever 20 being clear of the arm 29, the plate 21 may be rocked back to register the port 14 with the intake port if necessary. During this forward shifting of the pedal 36, the vacuum back of the piston 25 has been destroyed and the spring 31 has pulled the block 27 entirely forward to release the clutch lever 32 and allow the clutch to engage smoothly, the rate of engagement being determined by the opening of the valve 18. The automobile is then in motion and its speed is determined by the position of the pedal 36. In the first movement of the pedal 36, the point 51 of the cam 43 was carried below the notch 46 on the lever 44, and as long as the clutch remains engaged, the point 51 is held below that notch. If it is desired to shift to a different gear ratio or to allow the automobile to coast under its own momentum uninfluenced by braking action of the engine, the pedal throttle 36 is allowed to return to rock the cam point 51 up to drop into the notch 46 on the lever 44 as may readily be determined by the slight jar on the operator's foot. As the cam point 51 moves up the lever 44 to this point, the lever 44 is allowed to be pulled back against the cam as it rocks through the pull of the spring 48 and the lever 19, the inner end of which is still against the center stop 52. As soon as the plug 12 is carried around by the spring to bring the port 13 into registry with the vacuum line port, air is then exhausted from behind the piston 25 to cause the block 27 to shift back to rock the clutch lever 32 to disengage the clutch. This movement of the piston 25 brings the arm 29 back against the pin 30 of the lever 20 and as the arm 29 continues backward, the lever 19 being held against backward travel, the lever 20 carries the plate 21 around anti-clockwise to shift the port 13 out of registry to stop the exhausting of air and the piston 25 comes to a stop holding the cam block 27 to have the clutch lever 32 rocked to disengage the clutch but not rocking the brake lever 33. Should air leak in to back of the piston 25, the piston will travel forwardly to tend to allow the clutch to reengage, but the spring 48 causes the plug 12 to follow such piston movement to again register the port 13. The pedal 36 could also be released somewhat to allow the plug to rotate back into registry. Thus the clutch lever 32 may be held in the rocked position without rocking the lever 33 so that the transmission gears may be shifted or the automobile allowed to coast without the drag of the engine. The clutch can be reengaged by simply pressing the pedal 36 forwardly to rock the plug 12 around to register the port 14 with the intake port. The various members are adjusted so that the driving range of operation of the engine throttle is had within the travel of the plug 12 between the point of non-registry of the plug 13 with the vacuum line and registry of the port 14 with the intake port.

To apply the brakes and stop the automobile, the pedal 36 is simply released gradually to allow the point 51 of the cam to come up to the notch 46 and above. As this release is had, the spring first pulls the plate 21 around clockwise with the inner end of the lever 19 against the stop 52 to allow the port 13 to register with the vacuum line port and thus allow air to exhaust from back of the piston 25. As the piston 25 moves back, the clutch lever 32 is first rocked and the clutch disengaged. Continued travel brings the arm 29 against the pin 30 to rock back on the lever 20. When the pedal 36 is released, the lever 19 is still in the position with its inner end against the center stop 52 so that as the arm 29 moves against the pin 30 the lever 20 is free to move therewith while it rocks the lever 19 through the link to carry it around to pull the lever 44 back against the cam 43 which action permits the continued and quick movement of the block 27 on back under the brake lever 33 to apply the brakes quickly. If a gradual application is desired the pedal 36 is shifted ahead slightly to arrest the rocking of the lever 19 by the lever 20 so that the lever 20 then shifts the plug 12 upon the pushing back of the lever by the arm 29 so as to shift the port 13 out of complete registry and thus slow up the rate of air exhausting. Therefore, by manipulating the pedal 36 through a small travel, the rate of application of the brakes is controlled. When the pedal 36 is completely released, the clutch is disengaged and the brakes applied. Whenever the point 51 is above the notch 46, the clutch is released. When the engine stops, there is no longer any degree of vacuum in the manifold 17 and line 16, and the arm 29 then moves ahead away from the lever 20, allowing the spring 48 to hold the valve plug 12 in the original normal position with the port 13 registered with the vacuum line port.

It is to be understood that the degree of brake application is determined and controlled by the movement of the pedal 36, forward movement tending to release and rearward movement to apply the brakes. There is a balancing or "see-sawing" effect between the arm 29 and the rod 47 by the levers 19 and 20 through the connecting link 22, and by moving the pedal 36 to compensate for movement of the arm 29, a very smooth control is to be had of the brakes. The valve plug 12 in reality "floats" between the arm 29 and the rod 47, the movement of one modifying the movement of the other, and it is this modifying effect that gives my invention the smooth control. The notch 46 is provided on the lever 44 simply as a means to indicate to the operator when the clutch is disengaged. The device is entirely operative without the notch.

While I have here shown and described my invention in the form as now best known to me, it is obvious that structural changes may be made without departing from the spirit of the invention, and I, therefore, do not desire to be limited beyond the limitations imposed by the following claims.

I claim:

1. In a control system for an automobile having an engine intake, the combination of a clutch throw-out lever; a brake actuating lever; a throttle lever; a chamber; a movable member within the chamber adapted to be shifted in the chamber upon a difference in pressure existing in the chamber on each side of the member; a cam block adjacent said clutch and brake levers adapted to be shifted thereagainst to rock the levers; a rod connecting said block and said member; a valve having a communicating passageway with said chamber; a shiftable plug in said valve; a vacuum pipe line between said valve and said intake; a pair of levers pivotally connected with said plug member, said levers being pivotally interconnected whereby the rocking of one lever will normally rock the other lever; a stop carried by said connecting rod against which one of said plug levers may rock; and a rod connected to the other of said levers adapted to be shifted by said throttle lever; said valve having an air inlet port, and said valve plug being formed to provide communication between said vacuum line and said chamber, between said air inlet port and the chamber, and to close off said vacuum line and said port, upon selective shifting of said plug as determined by the travel of said throttle actuated rod and as modified by movement of said stop whereby the position of said cam block relative to said clutch and brake pedals may be controlled by the shifting of said throttle lever to affect the position of said valve plug.

2. In an automobile clutch and brake control system, clutch and brake operating levers, a throttle control member, a pressure operated member mounted to shift said clutch and brake levers upon travel thereof, a valve having a selectively shiftable member to control the flow of the medium therethrough employed to change the pressure actuating said operated member, a leverage system engaging said shiftable member and interconnecting with said throttle control and said operated member, said system being formed to reverse the shifting of the valve member by travel of the operated member following an initial shifting of the throttle control.

3. In an automobile clutch and brake control system, clutch and brake operating levers, a throttle control member, a pressure operated member mounted to shift said clutch and brake levers upon travel thereof, a valve having a selectively shiftable member to control the flow of the medium therethrough employed to change the pressure actuating said operated member, a leverage system engaging said shiftable member and interconnecting with said throttle control and said operated member, said system being formed to modify the shifting of the valve member by travel of the operated member following an initial shifting of the throttle control, said clutch operating lever normally standing in advance of said brake lever, and said pressure operated member carrying a fitting initially rocking said clutch lever to a clutch release position before rocking said brake lever upon travel of said operated member.

4. In an automobile throttle controlled clutch and brake lever operating mechanism, pressure operated actuating means, a member shiftable by said means to rock said levers, a pressure control valve, and a valve operating leverage system interconnected with the throttle control and said shiftable member, said valve being operated by moving said throttle control to rock said leverage system and allowing said shiftable member to modify the rocking of the system as the member may be moved through the variation in pressure effected by operation of the valve.

5. In an automobile clutch and brake operating device, a chamber, a member in the chamber shiftable therein by change in fluid pressure, clutch and brake operating levers, a lever rocking member connected to said chamber member formed to intercept said levers and rock them upon travel thereof, a control valve communicating with said chamber, a vacuum line connected with the valve, said valve having an intake port, an engine throttle control member, a valve operating leverage system, means interconnecting said throttle control member and one end of said leverage system and stop means moving with said rocking and chamber members located in the path of the other end of said system.

6. In an automobile clutch and brake operating device, a chamber, a member in the chamber shiftable therein by change in fluid pressure, clutch and brake operating levers, a lever rocking member connected to said chamber member formed to intercept said levers and rock them upon travel thereof, a control valve communicating with said chamber, a vacuum line connected with the valve, said valve having an intake port, an engine throttle control member, a valve operating leverage system, means interconnecting said throttle control member and one end of said leverage system and stop means moving with said rocking and chamber members located in the path of the other end of said system, and spring means normally tending to return said valve to an initial position following a rotation thereof by either said throttle control interconnecting means or said stop means.

7. In an automobile clutch and brake operating device, a chamber, a member in the chamber shiftable therein by change in fluid pressure, clutch and brake operating levers, a lever rocking member connected to said chamber member formed to intercept said levers and rock them upon travel thereof, a control valve communicating with said chamber, a vacuum line connected with the valve, said valve having an intake port, an engine throttle control member, a valve operating leverage system, means interconnecting said throttle control member and one end of said leverage system and stop means moving with said rocking and chamber members located in the path of the other end of said system, said clutch lever being mounted to extend normally in advance of said brake lever to be rocked initially to a clutch release position in advance of the rocking of said brake lever.

8. In an automobile clutch and brake operating device, a chamber, a member in the chamber shiftable therein by change in fluid pressure, clutch and brake operating levers, a lever rocking member connected to said chamber member formed to intercept said levers and rock them upon travel thereof, a control valve communicating with said chamber, a vacuum line connected with the valve, said valve having an intake port, an engine throttle control member, a leverage system carried by the valve, means interconnecting said throttle control member and one end of said leverage system and stop means moving with said rocking and chamber members located in the path of the other end of said system, said leverage system comprising a pair of levers individually pivoted to said valve in spaced apart relation and a link interconnecting said levers.

9. In an automobile clutch and brake operating system, the combination with a shiftable throttle control member, a clutch operating lever, and a brake operating lever, of a cylinder, a piston in the cylinder adapted to be shifted therein upon pressure variation on the two sides of the piston, a clutch and brake lever rocking member interconnected with said piston normally resting in a non-rocking position, a vacuum line, a shiftable valve member between the line and said cylinder, means yieldingly retaining said valve member in a normal position to interconnect said line with said cylinder, a leverage system rockably connecting with said valve member, connecting means between said throttle control member and said leverage system whereby said system may be rocked by said control member, a stop limiting the degree of rocking of the system whereby said valve member may be shifted by the control member upon sufficient travel thereof to close off said line from said cylinder, and a stop movable with said lever rocking member adapted to travel into the path of said system upon return of said control member to retard the rate of return of said valve member to its normal position.

10. In an automobile clutch and brake operating system, clutch and brake operating members, pressure operating means for shifting said members, a valve for controlling the pressure available to said operating means, a control member, and means connected with said valve interposed between said operating means and said control member actuated upon a predetermined travel of said operating means to shift said valve, whereby said control member may be shifted to move said connected means to shift said valve to return it the distance shifted.

In testimony whereof I affix my signature.
VIRGIL H. MEDLOCK.